United States Patent
Cheng et al.

(10) Patent No.: US 10,670,778 B2
(45) Date of Patent: Jun. 2, 2020

(54) OPTICAL LENS, OPTICAL SYSTEM AND METHOD OF MANUFACTURING OPTICAL LENS

(71) Applicant: HTC Corporation, Taoyuan (TW)

(72) Inventors: Yen-Fang Cheng, Taoyuan (TW); Yen-An Chen, Taoyuan (TW)

(73) Assignee: HTC Corporation, Taoyuan (TW)

( * ) Notice: Subject to any disclaimer, the term of this patent is extended or adjusted under 35 U.S.C. 154(b) by 148 days.

(21) Appl. No.: 15/896,072

(22) Filed: Feb. 14, 2018

(65) Prior Publication Data
US 2019/0025472 A1      Jan. 24, 2019

Related U.S. Application Data

(60) Provisional application No. 62/535,221, filed on Jul. 20, 2017.

(51) Int. Cl.
G02B 3/00 (2006.01)
G02B 27/00 (2006.01)
G02B 26/10 (2006.01)

(52) U.S. Cl.
CPC ........... G02B 3/005 (2013.01); G02B 3/0031 (2013.01); G02B 3/0043 (2013.01); G02B 26/10 (2013.01); G02B 27/0093 (2013.01)

(58) Field of Classification Search
CPC .. G02B 26/10; G02B 27/0093; G02B 3/0031; G02B 3/0043; G02B 3/005
See application file for complete search history.

(56) References Cited

U.S. PATENT DOCUMENTS

| 6,624,934 B1 | 9/2003 | Moshrefzadeh et al. |
| 2014/0140068 A1* | 5/2014 | Eom ................ F21V 5/004 362/307 |
| 2018/0113240 A1* | 4/2018 | Watanabe ............ G02B 3/0043 |

FOREIGN PATENT DOCUMENTS

| EP | 2884332 | 6/2015 |
| EP | 3170674 | 5/2017 |

(Continued)

OTHER PUBLICATIONS

PL 520 Manufacturing specification by OSRSM published on Oct. 23, 2013.*

(Continued)

Primary Examiner — Joseph P Martinez
Assistant Examiner — Vipin Patel
(74) Attorney, Agent, or Firm — JCIPRNET

(57) ABSTRACT

An optical lens adapted to be disposed on a transmission path of a light beam is provided. The optical lens includes a plurality of lenticular lens units extending along the same direction, and the lenticular lens units are disposed side by side along a direction perpendicular to the extension direction thereof, wherein each of the lenticular lens units has a height relative to a bottom surface of the optical lens, adjacent two of the lenticular lens units have a height difference D therebetween, and the optical lens satisfies $$D \geq \sqrt{\frac{2\ln(2)}{\pi n} \frac{\lambda^2}{\Delta\lambda}},$$

wherein n represents a refractive index of the optical lens, λ represents a central wavelength of the light beam, and Δλ represents a spectral bandwidth of the light beam. In addi- (Continued)

tion, an optical system and a method of manufacturing an optical lens are also mentioned.

14 Claims, 12 Drawing Sheets

(56) References Cited

FOREIGN PATENT DOCUMENTS

| | | |
|---|---|---|
| EP | 3282293 | 2/2018 |
| TW | 201100873 | 1/2011 |
| TW | 201344253 | 11/2013 |
| TW | 201513422 | 4/2015 |
| TW | 201532330 | 8/2015 |
| WO | 2006064259 | 6/2006 |
| WO | 2010141261 | 12/2010 |
| WO | 2016163125 | 10/2016 |

OTHER PUBLICATIONS

PL 450B Manufacturing specification by OSRSM published on Oct. 23, 2013.*
Kim et al., "Fabrication of a fused silica based mold for the microlenticular lens array using a femtosecond laser and a CO2 laser", Optical Materials Express, Oct. 3, 2014, pp. 2233-2240.
"Notice of allowance of Taiwan Counterpart Application", dated Nov. 27, 2018, p. 1-p. 5.
"Office Action of Europe Counterpart Application", dated Dec. 21, 2018, p. 1-p. 6.
"Search Report of Europe Counterpart Application", dated Dec. 5, 2018, p. 1-p. 4.

* cited by examiner

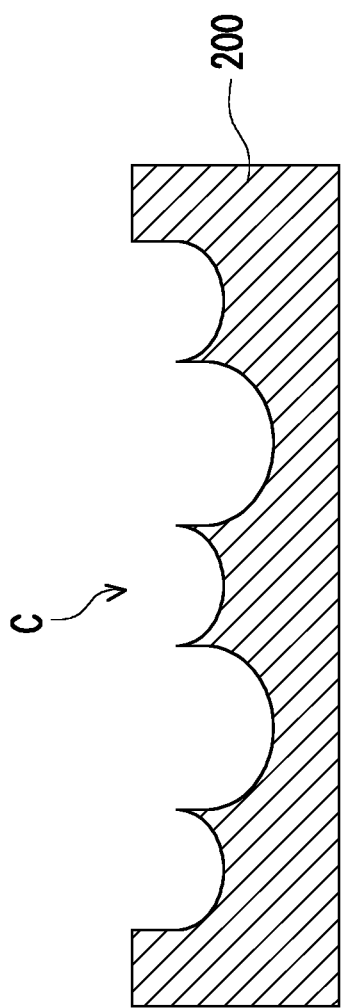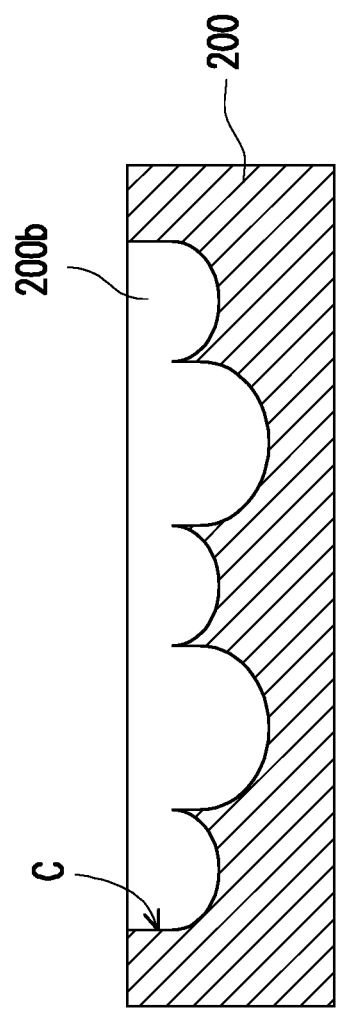

OPTICAL LENS, OPTICAL SYSTEM AND METHOD OF MANUFACTURING OPTICAL LENS

CROSS-REFERENCE TO RELATED APPLICATION

This application claims the priority benefit of U.S. provisional application Ser. No. 62/535,221, filed on Jul. 20, 2017. The entirety of the above-mentioned patent application is hereby incorporated by reference herein and made a part of this specification.

TECHNICAL FIELD

The disclosure relates to an optical lens, an optical system and a method of manufacturing an optical lens.

DESCRIPTION OF RELATED ART

Linear light obtained by projecting laser light through a lenticular lens may be used as an emission source for optical tracking. For example, this emission source may be applied in a positioning and tracking system in virtual reality (VR). More specifically, laser light emitted by a laser light source in a base station or a lighthouse passes through a lenticular lens to form linear light, and a motor in the base station or the lighthouse having the lenticular lens mounted thereon continuously rotates to thus enable the linear light to continuously scan a specific space. A plurality of light sensors are disposed on a head mounted display (HMD) or a controller to detect the linear light emitted from the base station or the lighthouse. According to rotation angle and frequency of the motor as well as a time difference between time points at which the linear light is detected by each of the light sensors, the system can determine six-axis coordinates of the HMD or the controller in the space.

However, in light pattern distribution of such linear light, a problem of non-uniform brightness often arises in, for example, bright regions and dark regions of the linear light. More specifically, when the dark regions of the linear light scan over the light sensors, the dark regions of the linear light may not be detected by the light sensors, and positioning accuracy is thus affected.

SUMMARY

The disclosure provides an optical lens causing light projected therethrough to be uniform in brightness.

The disclosure provides an optical system projecting light which is uniform in brightness.

The disclosure provides a method of manufacturing the aforesaid optical lens.

An embodiment of the disclosure provides an optical lens adapted to be disposed on a transmission path of a light beam. The optical lens includes a plurality of lenticular lens units extending along the same direction, and the lenticular lens units are disposed side by side along a direction perpendicular to the extension direction thereof, wherein each of the lenticular lens units has a height relative to a bottom surface of the optical lens, adjacent two of the lenticular lens units have a height difference D therebetween, and the optical lens satisfies $$D \geq \sqrt{\frac{2\ln(2)}{\pi n}} \frac{\lambda^2}{\Delta\lambda},$$

wherein n represents a refractive index of the optical lens, $\lambda$ represents a central wavelength of the light beam, and $\Delta\lambda$ represents a spectral bandwidth of the light beam.

An embodiment of the disclosure provides an optical system including a light source and an optical lens. The light source is adapted to emit a light beam. The optical lens is disposed on a transmission path of the light beam. The optical lens includes a plurality of lenticular lens units extending along the same direction, and the lenticular lens units are disposed side by side along a direction perpendicular to the extension direction thereof, wherein each of the lenticular lens units has a height relative to a bottom surface of the optical lens, adjacent two of the lenticular lens units have a height difference D therebetween, and the optical lens satisfies $$D \geq \sqrt{\frac{2\ln(2)}{\pi n}} \frac{\lambda^2}{\Delta\lambda},$$

wherein n represents a refractive index of the optical lens, $\lambda$ represents a central wavelength of the light beam, and $\Delta\lambda$ represents a spectral bandwidth of the light beam.

An embodiment of the disclosure provides a method of manufacturing the aforesaid optical lens, the method including the following steps. A mold having a cavity having a shape corresponding to the lens units is provided. A lens material is filled into the cavity. The lens material is cured. The cured lens material is separated from the mold.

Based on the above, an embodiment of the disclosure proposes an optical lens including a plurality of lenticular lens units, and adjacent two of the lenticular lens units have the height difference D therebetween. The optical lens satisfies $$D \geq \sqrt{\frac{2\ln(2)}{\pi n}} \frac{\lambda^2}{\Delta\lambda},$$

wherein n represents the refractive index of the optical lens, $\lambda$ represents the central wavelength of the light beam, and $\Delta\lambda$ represents the spectral bandwidth of the light beam. With the above design, it can be prevented that, after the light beam passes through two adjacent lenticular lens units with no height difference therebetween, interference occurs and affects uniformity of the light. In addition, since adjacent two of the lenticular lens units have a height difference therebetween, in the light obtained by projecting the light beam through the optical lens, formation of dark regions with relatively low brightness can be prevented, so that the light obtained by projecting the light beam through the optical lens is more uniform in brightness.

To make the above features and advantages of the disclosure more comprehensible, examples accompanied with drawings are described in detail as follows.

BRIEF DESCRIPTION OF THE DRAWINGS

FIG. 6A to FIG. 6C are schematic views illustrating a method of manufacturing an optical lens according to an embodiment of the disclosure.

DESCRIPTION OF THE EMBODIMENTS

Figure 1A:
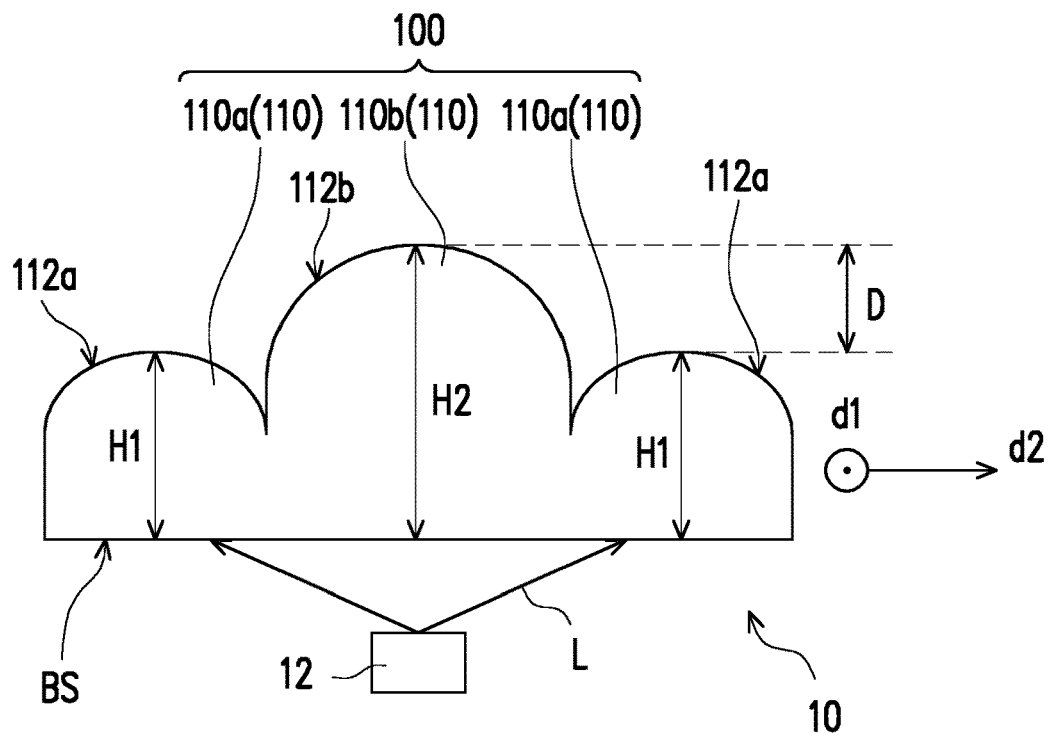
FIG. 1A is a side view of an optical system according to an embodiment of the disclosure.
Figure 1B:
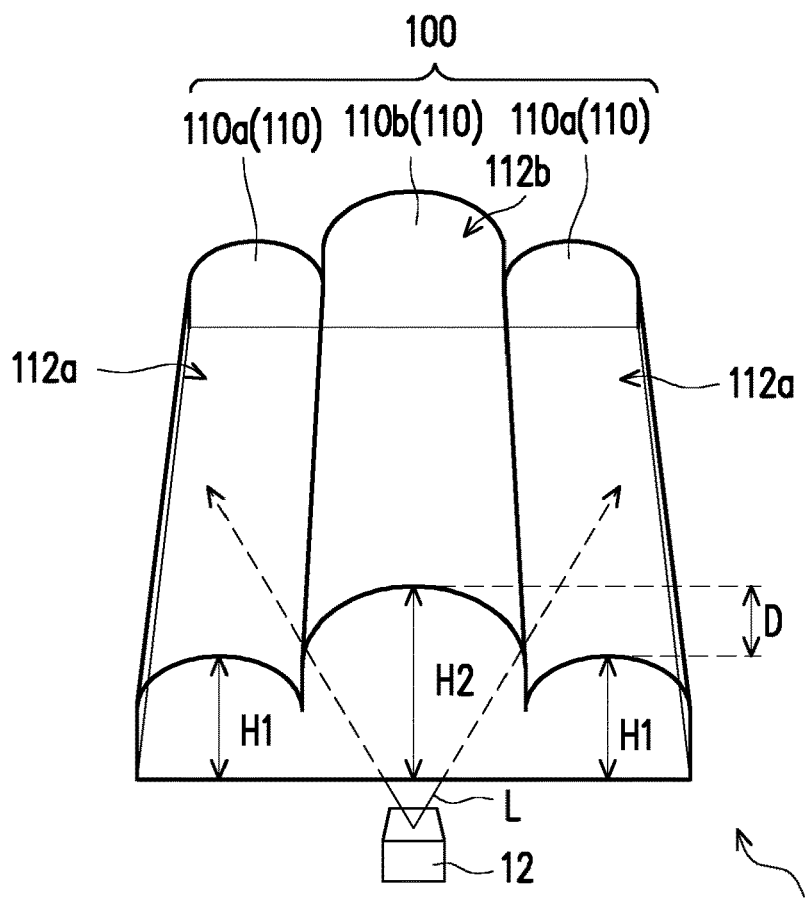
FIG. 1B is a three-dimensional view of the optical system in FIG. 1A.

FIG. 1A is a side view of an optical system according to an embodiment of the disclosure. FIG. 1B is a three-dimensional view of the optical system in FIG. 1A. As shown in FIG. 1A and FIG. 1B, an optical system 10 of the present embodiment includes a light source 12 and an optical lens 100. The light source 12 is adapted to emit a light beam L. The optical lens 100 is disposed on a transmission path of the light beam L. The optical lens 100 includes a plurality of lenticular lens units 110 extending along the same direction (for example, a direction d1 perpendicular to the drawing sheet of FIG. 1A), and the lenticular lens units 110 are disposed side by side along a direction (for example, a left-right direction d2 of the drawing sheet of FIG. 1A) perpendicular to the extension direction. In the present embodiment, a material of the optical lens 100 includes, for example, polycarbonate (PC) or other suitable transparent material.

Specifically, the lenticular lens units 110 of the present embodiment include two first lenticular lens units 110a and one second lenticular lens unit 110b, and the second lenticular lens unit 110b is disposed between the two first lenticular lens units 110a.

In the present embodiment, the first lenticular lens units 110a have a first curved surface 112a opposing a bottom surface BS, the second lenticular lens unit 110b has a second curved surface 112b opposing the bottom surface BS, and the first curved surface 112a and the second curved surface 112b have the same curvature. Thus, the first lenticular lens units 110a and the second lenticular lens unit 110b are similar in appearance. In other embodiments, the first curved surface 112a and the second curved surface 112b may have different curvatures, and the disclosure is not limited thereto. By controlling the curvatures of the first curved surface 112a and the second curved surface 112b, a range of light pattern distribution can be adjusted.

In the present embodiment, each of the first lenticular lens units 110a has the same first height H1 relative to the bottom surface BS of the optical lens 100, and the second lenticular lens unit 110b has a second height H2 relative to the bottom surface BS of the optical lens 100, wherein the first height H1 is different from the second height H2. Herein, the first lenticular lens unit 110a and the second lenticular lens unit 110b adjacent thereto have a height difference D therebetween, and the optical lens 100 satisfies $$D \geq \sqrt{\frac{2\ln(2)}{\pi n}} \frac{\lambda^2}{\Delta\lambda},$$

wherein n represents a refractive index of the optical lens 100, λ represents a central wavelength of the light beam L, and Δλ represents a spectral bandwidth of the light beam L.

With the above design, it can be prevented that, after the light beam L passes through two adjacent lenticular lens units 110 with no height difference therebetween, interference occurs and affects uniformity of the light. In addition, since a distance between two identical first lenticular lens units 110a increases and the first lenticular lens unit 110a and the second lenticular lens unit 110b adjacent thereto have the height difference D therebetween, in the light obtained by projecting the light beam L through the optical lens 100, formation of dark regions with relatively low brightness can be prevented.

For example, in the case where n=1.5, λ=800 nm and Δλ=10 nm, which means that the refractive index of the optical lens 100 is 1.5, the central wavelength of the light beam L emitted by the light source 12 is 800 nm and the spectral bandwidth of the light beam L is 10 nm, as long as the height difference D between the first lenticular lens unit 110a and the second lenticular lens unit 110b adjacent thereto is greater than or equal to 34.75 the formation of dark regions with relatively low brightness can be prevented in the light obtained by passing the light beam L through the optical lens 100.

In addition, in the present embodiment, the light source 12 is disposed on a side closer to the bottom surface BS. The light beam L emitted by the light source 12 enters the optical lens 100 via the bottom surface BS and exits the optical lens 100 via the first curved surface 112a or the second curved surface 112b. In other embodiments, the light source 12 may be disposed on a side away from the bottom surface BS. The light beam L emitted by the light source 12 enters the optical lens 100 via the first curved surface 112a or the second curved surface 112b and exits the optical lens 100 via the bottom surface BS.

Figure 2:
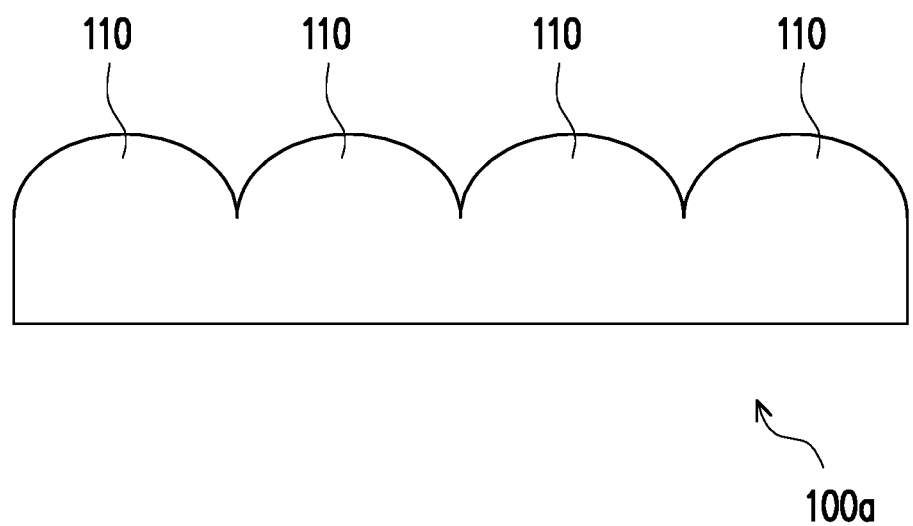
FIG. 2 is a side view of an optical lens having a plurality of lenticular lens units with the same height.
Figure 3:
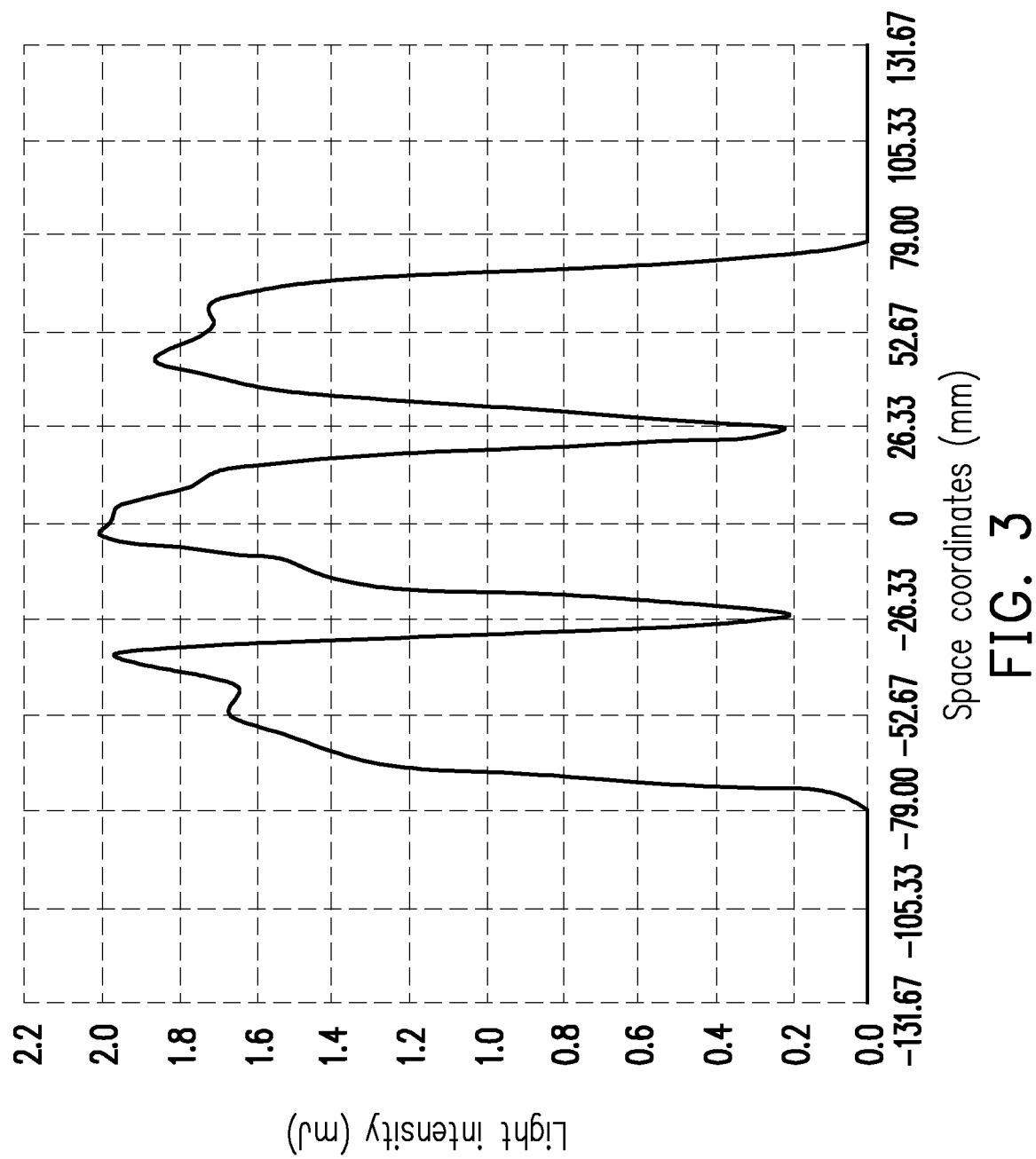
FIG. 3 illustrates light intensity distribution of an optical system including the optical lens in FIG. 2.
Figure 4:
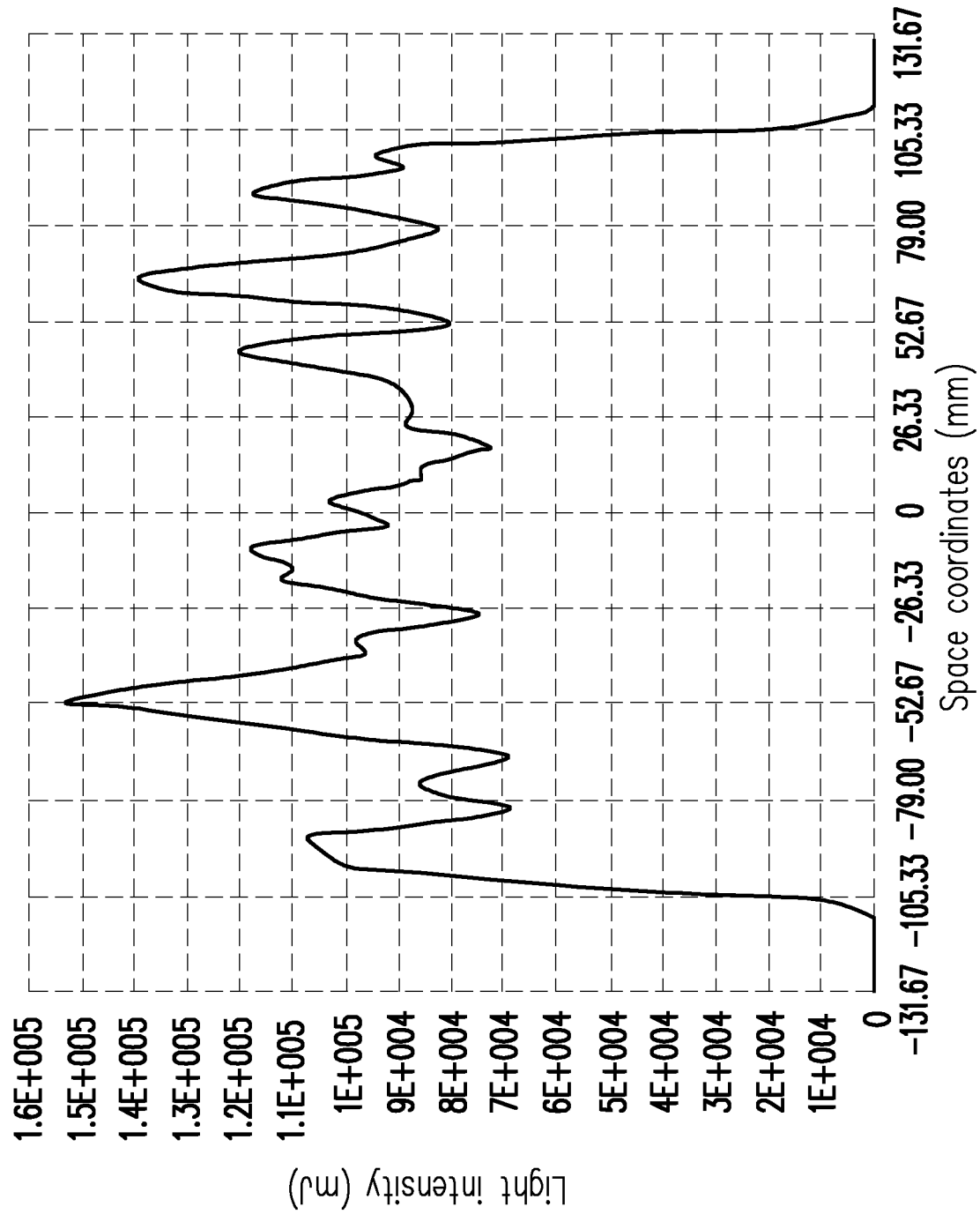
FIG. 4 illustrates light intensity distribution of the optical system in FIG. 1A.

FIG. 2 is a side view of an optical lens having a plurality of lenticular lens units with the same height. FIG. 3 illustrates light intensity distribution of an optical system including the optical lens in FIG. 2. FIG. 4 illustrates light intensity distribution of the optical system in FIG. 1A. As shown in FIG. 2, a plurality of lenticular lens units 110 of an optical lens 100a in FIG. 2 are identical, and there is no height difference between adjacent lenticular lens units 110. Such optical lens 100a has a common problem that the light obtained by projecting a light beam through the optical lens 100a is likely to be non-uniform in brightness. As shown in FIG. 3, in the light projected by an optical system including the optical lens 100a in FIG. 2, there are significant differences in light intensity between different space coordinates. That is, there are apparent bright regions and dark regions in light intensity distribution, and thus an inferior light pattern distribution is provided. However, it is clear from FIG. 3 and FIG. 4 that, compared to the case of the optical lens 100a in FIG. 2, the light obtained by projecting the light beam L through the optical lens 100 in FIG. 1A shows smaller differences in light intensity between different space coordinates. That is, there are no dark regions with relatively low brightness in light pattern distribution, and thus more uniform brightness is achieved.

Figure 5A:
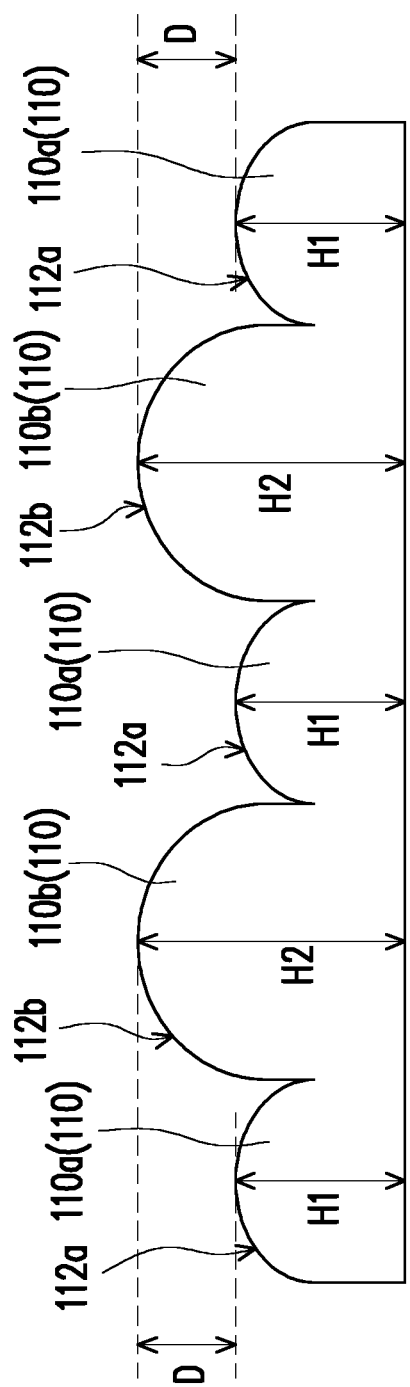
FIG. 5A is a side view of an optical lens according to an embodiment of the disclosure.

FIG. 5A is a side view of an optical lens according to an embodiment of the disclosure. As shown in FIG. 5A, components and related descriptions of an optical lens 100b of the present embodiment can be understood from the optical lens 100 of the embodiment of FIG. 1A, and will not be repeated herein. The optical lens 100b differs from the optical lens 100 in that, the optical lens 100b of the present embodiment includes a plurality of first lenticular lens units 110a and a plurality of second lenticular lens units 110b, and the first lenticular lens units 110a and the second lenticular lens units 110b are alternately arranged. In the present embodiment, the number of the first lenticular lens units 110a is three, and the number of the second lenticular lens units 110b is two. However, in other embodiments, the numbers of the first lenticular lens units 110a and the second lenticular lens units 110b are not limited to the above.

Figure 5B:
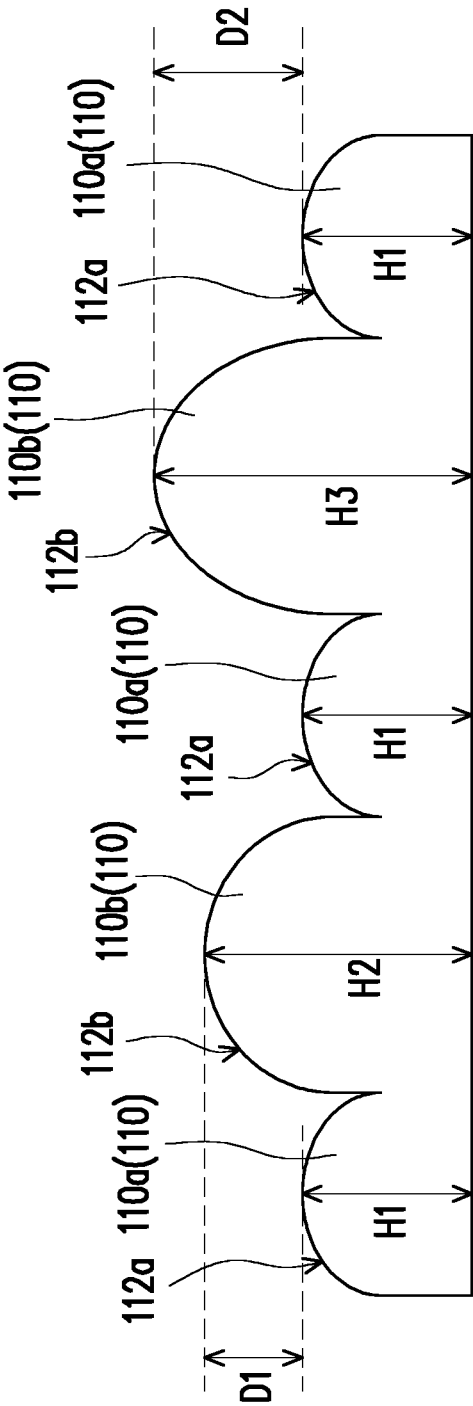
FIG. 5B is a side view of an optical lens according to an embodiment of the disclosure.

FIG. 5B is a side view of an optical lens according to an embodiment of the disclosure. As shown in FIG. 5B, components and related descriptions of an optical lens 100c of the present embodiment can be understood from the optical lens 100 of the embodiment of FIG. 1A, and will not be repeated herein. The optical lens 100c differs from the optical lens 100 in that, the optical lens 100c of the present embodiment includes a plurality of first lenticular lens units 110a and a plurality of second lenticular lens units 110b, and the first lenticular lens units 110a and the second lenticular lens units 110b are alternately arranged. The first lenticular lens units 110a have the same first height H1. The second lenticular lens units 110b have different heights from each other. For example, in FIG. 5B, the second lenticular lens unit 110b closer to the left side has a second height H2, and the second lenticular lens unit 110b closer to the right side has a third height H3, wherein the second height H2 is different from the third height H3. Thus, the second lenticular lens unit 110b closer to the left side and the first lenticular lens unit 110a adjacent thereto has a first height difference D1 therebetween, and the second lenticular lens unit 110b closer to the right side and the first lenticular lens unit 110a adjacent thereto has a second height difference D2 therebetween, wherein the first height difference D1 is different from the second height difference D2. In the present embodiment, the second lenticular lens units 110b have two different heights. However, in other embodiments, the second lenticular lens units 110b may have three, four or more different heights, and the disclosure is not limited thereto.

Figure 5C:
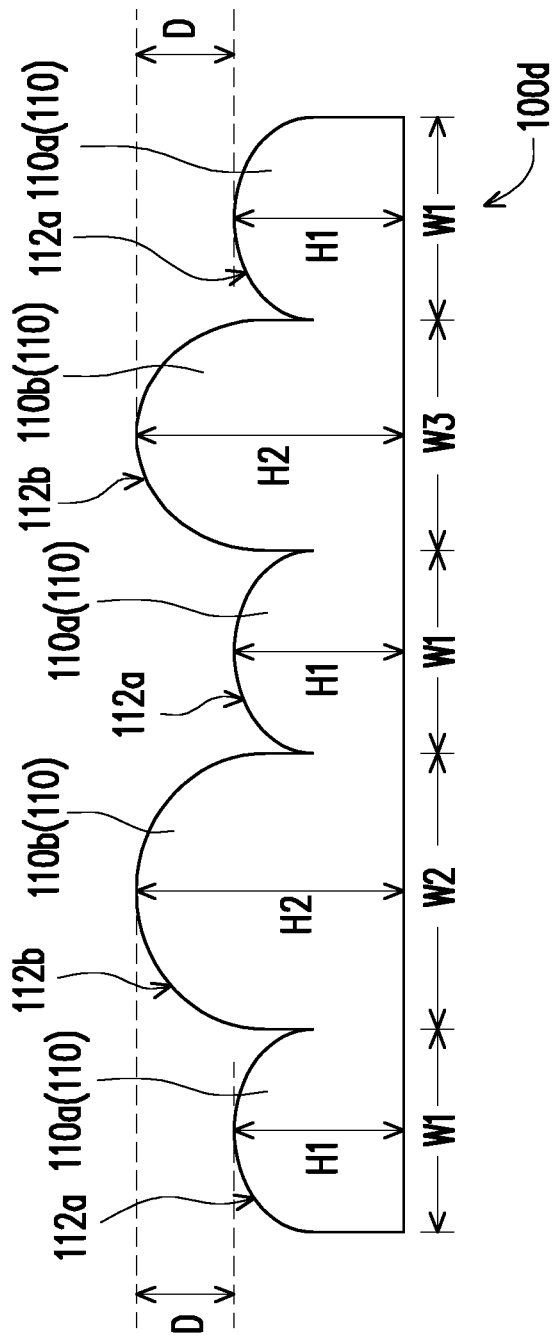
FIG. 5C is a side view of an optical lens according to an embodiment of the disclosure.

FIG. 5C is a side view of an optical lens according to an embodiment of the disclosure. As shown in FIG. 5C, components and related descriptions of an optical lens 100d of the present embodiment can be understood from the optical lens 100 of the embodiment of FIG. 1A, and will not be repeated herein. The optical lens 100d differs from the optical lens 100 in that, the optical lens 100d of the present embodiment includes a plurality of first lenticular lens units 110a and a plurality of second lenticular lens units 110b, and the first lenticular lens units 110a and the second lenticular lens units 110b are alternately arranged. The first lenticular lens units 110a have the same first width W1. The second lenticular lens units 110b have different widths from each other. For example, in FIG. 5C, the second lenticular lens unit 110b closer to the left side has a second width W2, and the second lenticular lens unit 110b closer to the right side has a third height W3, wherein the second width W2 is different from the third height W3. In the present embodiment, the second lenticular lens units 110b have two different widths. However, in other embodiments, the second lenticular lens units 110b may have three, four or more different widths. In addition, the first lenticular lens units 110a may also have different widths from each other, and the width of the first lenticular lens units may be the same as or different from the width of the second lenticular lens units 110b. The disclosure is not limited thereto.

Figure 6C:
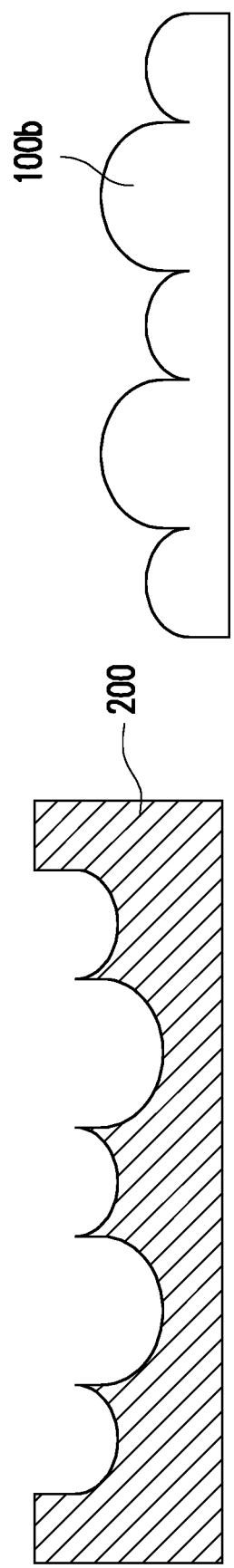

FIG. 6A to FIG. 6C are schematic views illustrating a method of manufacturing an optical lens according to an embodiment of the disclosure. The schematic views of the manufacturing method shown in the present embodiment illustrate an example of manufacturing the optical lens 100b as shown in FIG. 5A. However, the manufacturing method shown in the present embodiment may also be used to manufacture an optical lens in a different form, such as the optical lens 100 and the optical lens 100c of the aforesaid embodiments, an optical lens having other number of lenticular lens units, or an optical lens having lenticular lens units with other different height. The disclosure is not limited thereto.

Firstly, as shown in FIG. 6A, a mold 200 is provided, and the mold 200 has a cavity C having a shape corresponding to the lenticular lens units 110 as shown in FIG. 5A. Next, as shown in FIG. 6B, a lens material 200b is filled into the cavity C and cured. Finally, as shown in FIG. 6C, the cured lens material 200b is separated from the mold 200. In this way, the manufacture of the optical lens 100b is completed.

In the present embodiment, the optical lens 100b is formed by, for example, an injection molding process. In other embodiments, the optical lens may be formed by thermoforming or other suitable optical lens manufacturing process. In the present embodiment, the mold 200 is made, for example, by directly cutting a mold material or by performing molding using a mold core. However, the disclosure is not limited thereto.

Figure 7A:
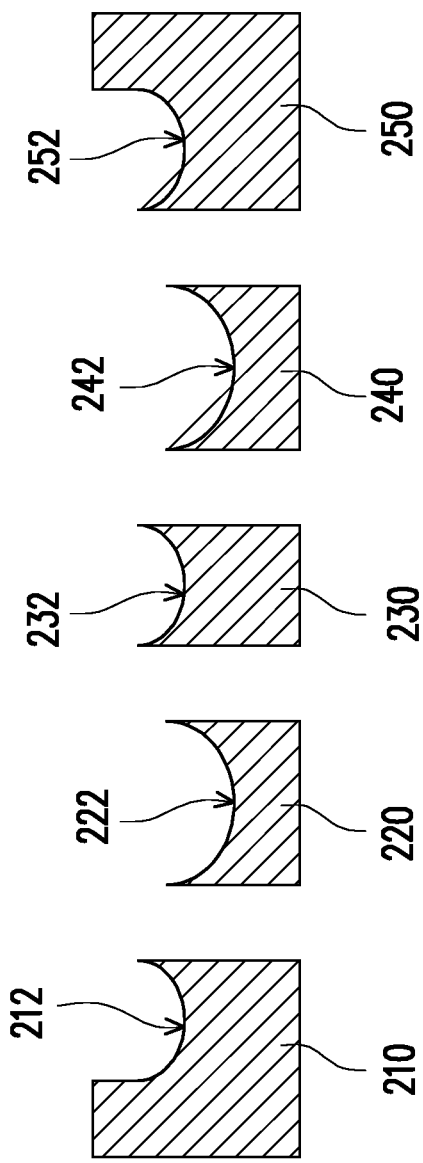
FIG. 7A to FIG. 7B are schematic views illustrating a method of manufacturing a mold in FIG. 6A.
Figure 7B:
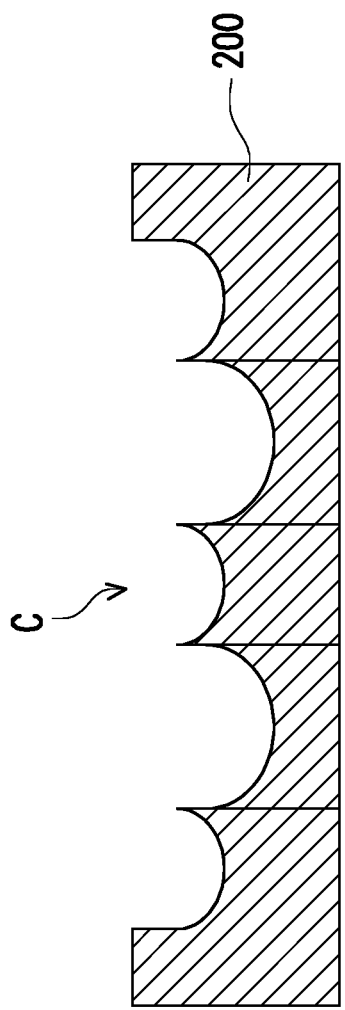

FIG. 7A to FIG. 7B are schematic views illustrating a method of manufacturing the mold in FIG. 6A. Firstly, as shown in FIG. 7A, a plurality of mold units 210, 220, 230, 240 and 250 independent of each other are provided. The mold units 210, 220, 230, 240 and 250 respectively have partial cavity surfaces 212, 222, 232, 242 and 252 corresponding to the lenticular lens units 110. Next, as shown in FIG. 7B, the mold units 210, 220, 230, 240 and 250 are disposed side by side to constitute the mold 200.

Figure 8A:
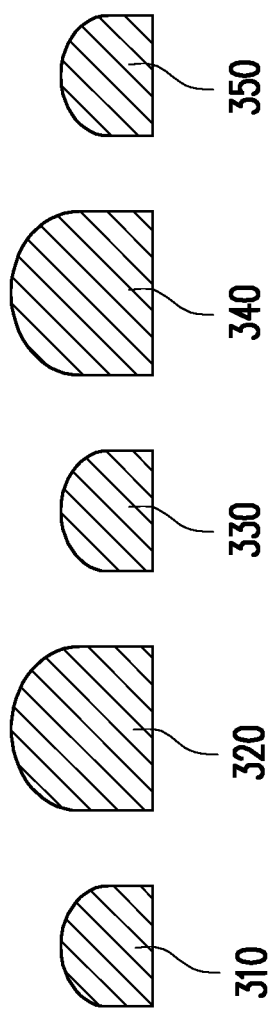
FIG. 8A to FIG. 8D are schematic views illustrating another method of manufacturing the mold in FIG. 6A.
Figure 8B:
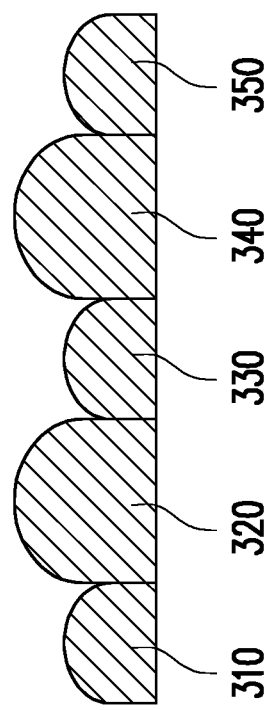
Figure 8C:
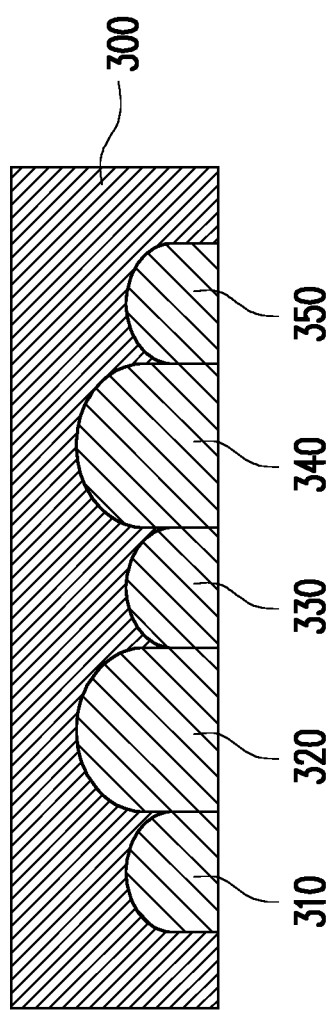
Figure 8D:
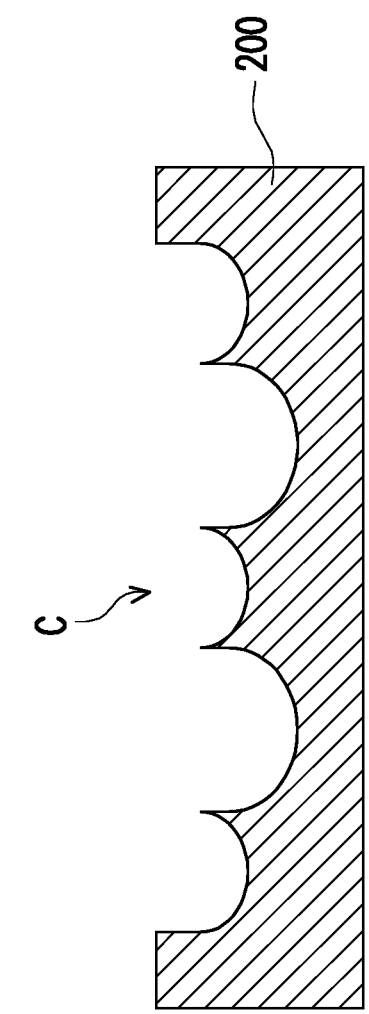

FIG. 8A to FIG. 8D are schematic views illustrating another method of manufacturing the mold in FIG. 6A. Firstly, as shown in FIG. 8A, a plurality of mold core units 310, 320, 330, 340 and 350 independent of each other are provided. The mold core units 310, 320, 330, 340 and 350 respectively have the same shapes and sizes as the lenticular lens units 110. Next, as shown in FIG. 8B, the mold core units 310, 320, 330, 340 and 350 are disposed side by side for performing molding. Firstly, as shown in FIG. 8C, a mold material 300 is pressed onto the mold core units 310, 320, 330, 340 and 350 and cured. Finally, as shown in FIG. 8D, the cured mold material 300 is separated from the mold core units 310, 320, 330, 340 and 350 to complete the manufacture of the mold 200.

In the present embodiment, a material of the mold core units 310, 320, 330, 340 and 350 includes, for example, metal or other suitable material. A material of the mold material 300 includes, for example, gypsum or other suitable material. The disclosure is not limited thereto.

In the embodiments shown in FIGS. 7A to 7B and FIGS. 8A to 8D, the mold units 210, 220, 230, 240 and 250 as well as the mold core units 310, 320, 330, 340 and 350 may be respectively independently made, and then combined with each other to obtain a required complete mold or mold core. Compared to cases of an integrally formed mold or mold core, in which, in a surface profile of the mold or mold core, formation of an ideal ridge line or valley line between any two adjacent units of the mold or mold core may be unlikely due to limits of processing accuracy and thus imaging quality of the optical lens is affected, the mold units or mold core units which are independently made can be combined to obtain a surface profile including a sharp ridge line or valley line. For example, sharp ridge lines or valley lines may be formed at connected parts between adjacent mold units 210, 220, 230, 240 and 250 or adjacent mold core units 310, 320, 330, 340 and 350.

In another respect, after the process of the respectively independent mold units or mold core units is completed, each of the mold units or mold core units may be subjected to an appearance and size inspection, which facilitates easy and precise control of manufacturing accuracy of the mold units or mold core units. In addition, after the mold units or mold core units are combined to obtain a complete mold or mold core, an appearance and size inspection may be carried out again thereon to ensure that the appearance and size of the entire optical lens meet the requirements.

Figure 9A:
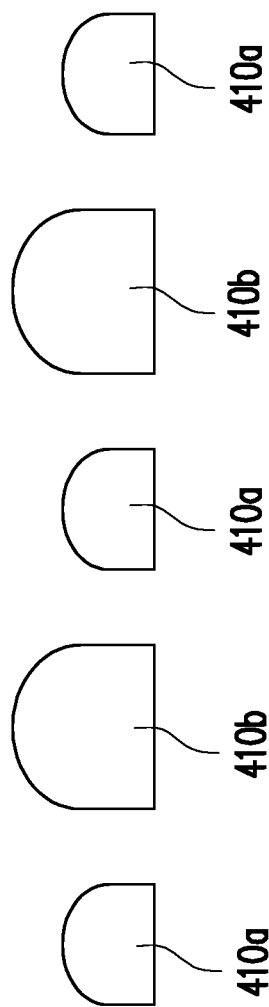
FIG. 9A to FIG. 9B are schematic views illustrating a method of manufacturing an optical lens according to an embodiment of the disclosure.
Figure 9B:
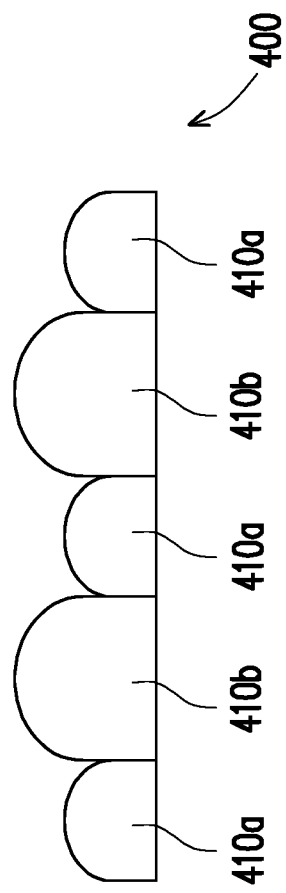

FIG. 9A to FIG. 9B are schematic views illustrating a method of manufacturing an optical lens according to an embodiment of the disclosure. Firstly, as shown in FIG. 9A, a plurality of first lenticular lens units 410a and second lenticular lens units 410b independent of each other are provided. In the present embodiment, the number of the first lenticular lens units 410a is, for example, three, and the first lenticular lens units 410a have the same shape and size as, for example, the first lenticular lens units 110a as shown in FIG. 1A. The number of the second lenticular lens units 410b is, for example, two, and the second lenticular lens units 410b have the same shape and size as, for example, the second lenticular lens units 110b as shown in FIG. 1A. In other embodiments, there may be other numbers of first lenticular lens units 410a and second lenticular lens units 410b, or the first lenticular lens units 410a and the second lenticular lens units 410b may be in other shapes or sizes. The disclosure is not limited thereto.

Next, as shown in FIG. 9B, the first lenticular lens units 410a and the second lenticular lens units 410b are disposed side by side so as to be alternately arranged. An optically clear adhesive (OCA) is used to stick the first lenticular lens units 410a and the second lenticular lens units 410b together to form an optical lens 400.

It should be noted that, the manufacturing methods of an optical lens or a mold according to the embodiments of the disclosure are capable of manufacturing, for example but not limited to, any of the optical lenses of the aforesaid embodiments and the mold corresponding thereto. The manufacturing methods of an optical lens or a mold according to the embodiments of the disclosure are applicable to an optical lens or a mold in any form in which the formation of an ideal ridge line or valley line between any two adjacent units of the optical lens or the mold is unlikely due to the limits of processing accuracy.

By providing a plurality of lenticular lens units, mold units and mold core units which are independent of each other, in the manufacturing methods of an optical lens or a mold according to the embodiments of the disclosure, the manufacturing accuracy of the optical lens or the mold can be easily and precisely controlled, so as to form an ideal ridge line or valley line, thereby ensuring that the appearance and size of the entire optical lens meet the requirements, so that the optical lens has ideal imaging quality.

In summary, an embodiment of the disclosure proposes an optical lens including a plurality of lenticular lens units, wherein adjacent two of the lenticular lens units have the height difference D therebetween. The optical lens satisfies $$D \geq \sqrt{\frac{2\ln(2)}{\pi n}} \frac{\lambda^2}{\Delta \lambda},$$

wherein n represents the refractive index of the optical lens, λ represents the central wavelength of the light beam, and Δλ represents the spectral bandwidth of the light beam. With the above design, it can be prevented that, after the light beam passes through two adjacent lenticular lens units with no height difference therebetween, interference occurs and affects uniformity of the light. In addition, since a distance between any two lenticular lens units of the same height increases and adjacent two of the lenticular lens units have a height difference therebetween, in the light obtained by projecting the light beam through the optical lens, the formation of dark regions with relatively low brightness can be prevented, so that the light obtained by projecting the light beam through the optical lens is more uniform n brightness.

Although the disclosure has been described with reference to the above examples, it will be apparent to one of ordinary skill in the art that modifications to the described examples may be made without departing from the spirit of the disclosure. Accordingly, the scope of the disclosure will be defined by the attached claims and not by the above detailed descriptions.

What is claimed is:

1. An optical lens adapted to be disposed on a transmission path of a light beam, the optical lens comprising:
   a plurality of lenticular lens units extending along a same direction, the lenticular lens units being disposed side by side along a direction perpendicular to the extension direction thereof, and each of the lenticular lens units comprising a cylindrical lenticular lens extending in a direction of a central axis thereof, wherein each of the lenticular lens units has a height relative to a bottom surface of the optical lens, any adjacent two of the lenticular lens units have a height difference therebetween, and the height difference is not less than a minimum height difference D defined by an equation:

$$D = \sqrt{\frac{2\ln(2)}{\pi n}} \frac{\lambda^2}{\Delta \lambda},$$

wherein n represents a refractive index of the optical lens, λ represents a central wavelength of the light beam, and Δλ represents a spectral bandwidth of the light beam.

2. The optical lens of claim 1, wherein the lenticular lens units comprise a plurality of first lenticular lens units and a plurality of second lenticular lens units, the first lenticular lens units and the second lenticular lens units are alternately arranged, the first lenticular lens units have a same first height and the second lenticular lens units have a same second height.

3. The optical lens of claim 1, wherein the lenticular lens units comprise a plurality of first lenticular lens units and a plurality of second lenticular lens units, the first lenticular lens units and the second lenticular lens units are alternately arranged, the first lenticular lens units have a same first height and the second lenticular lens units have different heights from each other.

4. The optical lens of claim 1, wherein each of the lenticular lens units has a curved surface opposing the bottom surface, and the curved surfaces have the same curvature.

5. The optical lens of claim 1, wherein each of the lenticular lens units has a curved surface opposing the bottom surface, and the curved surfaces have different curvatures.

6. A method of manufacturing the optical lens of claim 1, comprising:
providing a plurality of lenticular lens units independent of each other; and
sticking the lenticular lens units independent of each other together by using an optically clear adhesive, so as to form the optical lens.

7. An optical system, comprising:
a light source adapted to emit a light beam; and
an optical lens disposed on a transmission path of the light beam, the optical lens comprising:
a plurality of lenticular lens units extending along a same direction, the lenticular lens units being disposed side by side along a direction perpendicular to the extension direction thereof, and each of the lenticular lens units comprising a cylindrical lenticular lens extending in a direction of a central axis thereof, wherein each of the lenticular lens units has a height relative to a bottom surface of the optical lens, any adjacent two of the lenticular lens units have a height difference therebetween, and the height difference is not less than a minimum height difference D defined by an equation:

$$D = \sqrt{\frac{2\ln(2)}{\pi n} \frac{\lambda^2}{\Delta\lambda}},$$

wherein n represents a refractive index of the optical lens, $\lambda$ represents a central wavelength of the light beam, and $\Delta\lambda$ represents a spectral bandwidth of the light beam.

8. The optical system of claim 7, wherein the lenticular lens units of the optical lens comprise a plurality of first lenticular lens units and a plurality of second lenticular lens units, the first lenticular lens units and the second lenticular lens units are alternately arranged, the first lenticular lens units have a same first height and the second lenticular lens units have a same second height.

9. The optical system of claim 7, wherein the lenticular lens units of the optical lens comprise a plurality of first lenticular lens units and a plurality of second lenticular lens units, the first lenticular lens units and the second lenticular lens units are alternately arranged, the first lenticular lens units have a same first height and the second lenticular lens unit have different heights from each other.

10. The optical system of claim 7, wherein each of the lenticular lens units has a curved surface opposing the bottom surface, and the curved surfaces have the same curvature.

11. The optical system of claim 7, wherein each of the lenticular lens units has a curved surface opposing the bottom surface, and the curved surfaces have different curvatures.

12. A method of manufacturing the optical lens of claim 1, comprising:
providing a mold, the mold having a cavity having a shape corresponding to the lenticular lens units;
filling a lens material into the cavity;
curing the lens material; and
separating the cured lens material from the mold.

13. The method of claim 12, wherein a method of providing the mold comprises:
providing a plurality of mold units independent of each other, the mold units respectively having a partial mold surface corresponding to the lenticular lens units; and
disposing the mold units side by side to constitute the mold.

14. The method of claim 12, wherein a method of providing the mold comprises:
providing a plurality of mold core units independent of each other, the mold core units respectively having the same shapes and sizes as the lenticular lens units;
disposing the mold core units side by side, and performing molding to form the mold.

* * * * *